UNITED STATES PATENT OFFICE.

THOMAS MACFARLANE, OF MONTREAL, QUEBEC, CANADA.

PROCESS OF MAKING ZINC-SULPHIDE PIGMENT.

SPECIFICATION forming part of Letters Patent No. 331,249, dated November 24, 1885.

Application filed November 8, 1884. Serial No. 147,432. (No specimens.)

*To all whom it may concern:*

Be it known that I, THOMAS MACFARLANE, of Montreal, in the Province of Quebec and Dominion of Canada, have invented certain new and useful Improvements in the Manufacture of Anhydrous Sulphide of Zinc for Use Primarily as a Pigment; and I do hereby declare that the following is a full, clear, and exact description of the invention, which will enable others skilled in the art to which it appertains to make and use the same.

The first part of this invention consists in preparing a sulphide of lime or soda, which is done by one or other of the following methods:

First. Two parts of quicklime are slaked, mixed with one part of ground sulphur, and boiled together with water until the sulphur is dissolved. After subsidence the resulting yellow solution is drawn off. It contains sulphide and hyposulphite, together with some pentasulphide of calcium, and may be here designated as "sulphur-liquor No. 1."

Second. One part of quicklime is slaked, mixed with one part of the spent iron oxide produced in purifying illuminating-gas, which contains about fifty per cent. sulphur, and boiled together with water for about two hours. The resulting solution is of the same nature as described in the preceding paragraph, and may be termed "sulphur-liquor No. 2." The residue from this operation consists chiefly of iron oxide, and is dried and calcined, when it forms a reddish-brown pigment.

Third. Ordinary "tank-waste" from the soda or potash manufacture, (in which alkaline sulphates are used,) consisting chiefly of calcium sulphide, is exposed in loose heaps on inclined water-tight floors to the action of the atmosphere for three or four weeks, until it has acquired in the interior a greenish-yellow color and has absorbed sufficient oxygen and carbonic acid for the formation, in conjunction with moisture, of considerable quantities of carbonate of lime and sulphide of lime. Should the heap of tank-waste in thus weathering become heated to such an extent as to cause ignition and loss of sulphur, this is to be stopped by beating down the heap to exclude air, or cooling it down with water. The sulphide of lime, being soluble, is leached out with water, and fresh quantities of weathered tank-waste treated with it until it attains a strength of 10° to 26° Twaddell. In this case it contains from two and a quarter to two and a half equivalents of sulphur for each equivalent of calcium in the liquor. Besides the sulphide of lime there is therefore likewise present more or less bisulphide of calcium. The solution thus produced may be called "sulphur-liquor No. 3," and, like the others, is to be made use of in the manner hereinafter to be described. A liquor of a similar nature is produced by the gradual oxidation and lixiviation by ordinary atmospheric agencies of old tank-waste heaps and collecting the drainage from them. This drainage-liquor may be utilized in the same manner as sulphur-liquor No. 3.

Fourth. Common sulphate of soda or salt-cake is mixed with from thirty to fifty per cent. of its weight of bituminous coal or "drop," and fluxed in an ordinary reverberatory furnace, such as is used for making black ash. The newer revolving furnaces can also be used. The mixture fuses at a much lower temperature and in much less time than ordinary "black ash," and is withdrawn from the furnace as soon as the yellow "candles" or flames are fully developed. The resulting cakes of black sulphide of sodium, being porous, are easily lixiviated in tanks of the same description as those used for black ash, but they are supplied with steam-pipes at the bottom, so that the liquors may be raised to a boiling temperature or not less than 200° Fahrenheit. When the lixiviation is thus carried on by means of hot water and the liquors brought up to a strength of 25° Twaddell, a clear yellow solution is obtained of sulphide of soda or sulphide of sodium, containing also bisulphide and a certain proportion of carbonate of soda, but free from iron. This solution may be conveniently called "sulphur-liquor No. 4."

The second part of the invention consists in preparing a perfectly-pure solution of chloride of zinc by the following method: Metallic zinc, (either spelter, sheet or scrap zinc,) impure zinc oxide, galvanizers' waste, calcined zinc blende, or ores, whether raw or calcined, containing carbonate or oxide of zinc, are dissolved in hydrochloric acid, these substances being presented in excess to the acid until the latter is completely neutralized. The resulting solution is then evaporated in lead or cast-iron pans until it attains a specific gravity of at least 1.6. During this evaporation the manganese, iron, and other impurity which the solution may contain are, for the most part, rendered insoluble and separated. The evaporation may be continued until the solution is of such a strength that it solidifies on cooling, in which case it is ladled into sheet-iron alkali-drums and stored for use. When redissolved, it yields an almost pure solution of chloride of zinc. Any trace of iron which it may contain is precipitated by the addition of a small quantity of solution of chloride of lime.

The third part of the invention consists in mixing the sulphur-liquors with the zinc solution in order to the formation of a precipitate of hydrated sulphide of zinc mixed with more or less free sulphur. The chloride-of-zinc solution is added to either of the sulphur-liquors Nos. 1, 2, or 3 until the mixture shows a slightly-acid reaction. Hydrate of zinc sulphide with free sulphur is precipitated, and chloride of calcium remains in solution. The sulphur-liquors Nos. 1 and 2 yield the precipitate without any evolution of sulphureted hydrogen; but this is not the case with sulphur-liquor No. 3. When this has a strength of 10° or 20° Twaddell, and is mixed with the chloride-of-zinc solution, sulphureted hydrogen is produced abundantly, and may be collected and conducted away from the precipitating-vat. In order to do this the latter must be provided with an air-tight cover having an opening in the center, through which the agitator-shaft passes. The opening is furnished with a water-lute, in which an air-tight collar fastened on the shaft moves in order to prevent any escape of gas. The latter is led off through a pipe in the cover, and, being uncontaminated with other gases, may be ignited in a properly-constructed furnace or flue and burned to sulphurous acid, which may be used for the manufacture of sulphuric acid. The precipitate of zinc sulphide and free sulphur is then passed through filter-presses in order to separate it from the solution of chloride of calcium accompanying it. Pure hydrated sulphide of zinc is of a very finely-divided or slimy nature, and difficult to filter, even under great pressure; but the presence of the precipitated sulphur renders it more granulated and easy of filtration. The cakes produced in the filter-presses are dried in a drying-chamber of the usual construction, in which the temperature is not allowed to exceed 150° Fahrenheit. When sulphur-liquor No. 4 is substituted for the sulphur-liquors Nos. 1, 2, and 3, the result is the same, except that the residual liquid will be a solution of chloride of sodium instead of chloride of calcium.

The fourth part of the invention consists in igniting the mixture of hydrated zinc sulphide and sulphur obtained as above described. This is performed in gas-retorts or muffle-furnaces at a red heat and under continuous stirring of the charge. The water of hydration is thus expelled and the free sulphur burned off. When the charge has attained a low red heat, it is withdrawn from the furnace into water, where it disintegrates, forming a white pigment of great covering power. It is of great importance that the ignition should not be continued longer than is necessary for burning off the free sulphur; otherwise the pigment becomes yellow and loses "body." The sulphur in subliming and burning forms an atmosphere of itself or of sulphurous acid round the pigment, and prevents its oxidation. The time for the withdrawal of the charge from the furnace is indicated by the disappearance of the bluish or yellowish flame from the burning sulphur. When this is no longer visible, and the charge is thoroughly mixed, it is withdrawn. In some cases, where there is not enough of free sulphur present to prevent oxidation of the zinc and preserve body during the ignition, a suitable proportion may be added. The free sulphur in the mass should equal from five to ten per cent. of the sulphide. The sulphurous-acid vapors driven off may be utilized in the manufacture of sulphuric acid.

I am aware that it has been proposed to produce a pigment of sulphide of zinc and sulphate of lime intimately combined by mixing together a strong solution of sulphate of zinc, polysulphide of calcium, sulphide of soda, or other alkaline sulphide, and chloride of calcium. This process differs from mine, however, in that by my method no calcium salt is precipitated, and I obtain the anhydrous sulphide of zinc pure after ignition.

I claim as my invention—

1. The herein-described method of preparing sulphide of zinc, combined with free sulphur, for the purpose set forth, which consists in mixing together the herein-described solution of chloride of zinc and the herein-described sulphur-liquor until the mixture shows a slightly-acid reaction, then filtering the precipitate in order to separate the zinc sulphide and free sulphur from the accompanying solution of chloride of calcium, and finally drying the cakes of sulphide and free sulphur at a moderate temperature, substantially as set forth.

2. The herein-described method of preparing anhydrous zinc sulphide for use as a white pigment, which consists in first preparing a sulphur-liquor, substantially as described, then preparing a chloride-of-zinc solution, substantially as described, then mixing these two solutions together until the mixture shows a slightly-acid reaction, as specified, then filtering the precipitate, then drying the cakes composed of hydrated zinc sulphide, mixed with free sulphur, then igniting this mixture in a retort or furnace to drive off the water of hydration and the free sulphur, and finally drawing off the anhydrous sulphide of zinc in water, substantially as specified.

In witness whereof I have hereunto signed my name in the presence of two subscribing witnesses.

THOMAS MACFARLANE.

Witnesses:
T. G. LEDERS,
N. W. BROWN.